L. M. SMILEY.
FASTENER.
APPLICATION FILED AUG. 27, 1909.
966,959.
Patented Aug. 9, 1910.
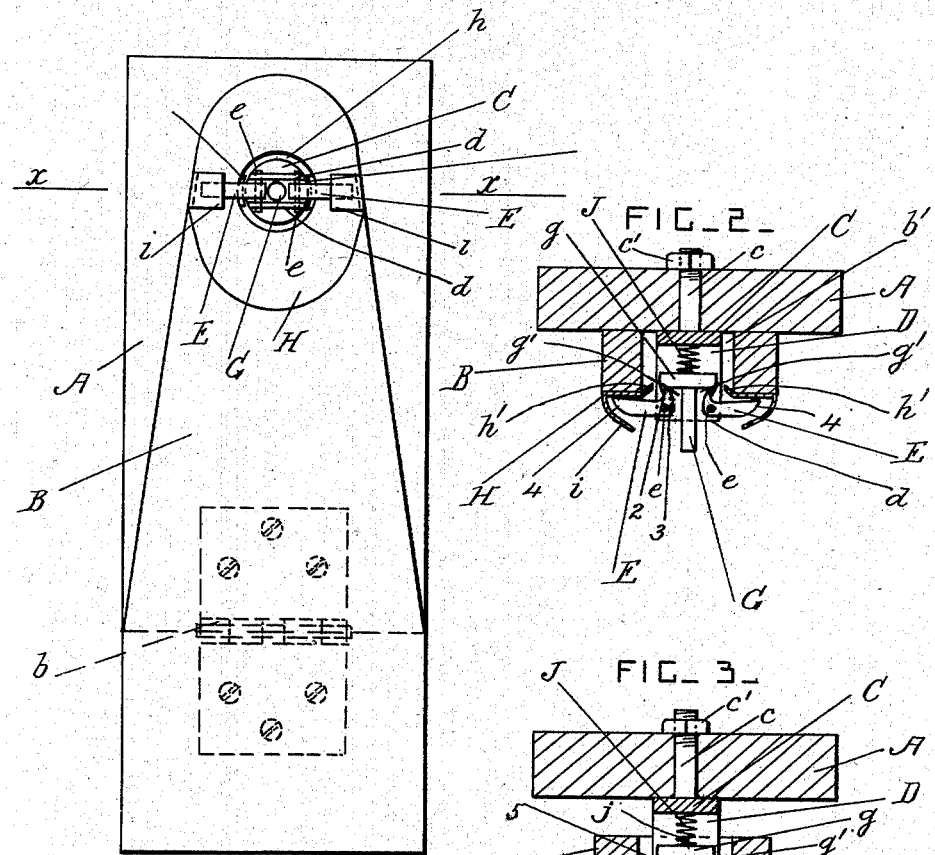
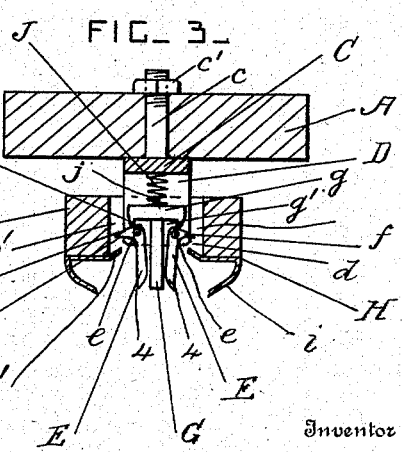
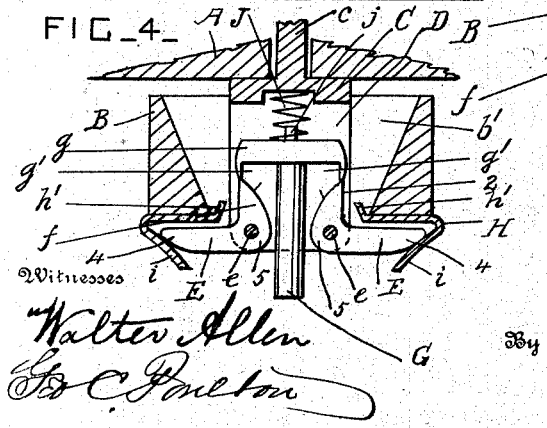
Inventor
Louis M. Smiley
By Herbert W. Jenner.
Attorney
Witnesses
Walter Allen
Geo. C. Poulton

UNITED STATES PATENT OFFICE.

LOUIS M. SMILEY, OF YODER, KANSAS.

FASTENER.

966,959.   Specification of Letters Patent.   Patented Aug. 9, 1910.

Application filed August 27, 1909. Serial No. 514,852.

*To all whom it may concern:*

Be it known that I, LOUIS M. SMILEY, a citizen of the United States, residing at Yoder, in the county of Reno and State of Kansas, have invented certain new and useful Improvements in Fasteners; and I do hereby declare the following to be a full, clear, and exact description of the invention, such as will enable others skilled in the art to which it appertains to make and use the same.

This invention relates to fasteners used on the end-gates of wagons and for fastening any other devices to which such fasteners are applicable; and it consists in the novel construction and combination of the parts hereinafter fully described and claimed.

In the drawings, Figure 1 is a front view of the fastener. Fig. 2 is a cross-section taken on the line $x$—$x$ in Fig. 1, showing the fastener closed. Fig. 3 is a cross-section similar to Fig. 2, but shows the fastener open. Fig. 4 is a cross-section through a portion of the parts, similar to Fig. 2 but drawn to a much larger scale, and it shows the catches just about to be placed in their locked positions.

A is a stationary support, and it may be a portion of the end-gate of a wagon. B is a movable plate and it also may be a portion of the end-gate of a wagon. These two parts are connected together by a hinge $b$, but they may be operatively connected in any other approved manner.

The stationary support A is provided with a pillar C which is rigidly secured to one side of it by means of a screw threaded stem or shank $c$ and a nut $c'$. The pillar C is provided with a slot D and it has lugs $d$ at its free end.

E designates two catches which are pivoted in the slot D by means of pins $e$ which pass through holes in the lugs $d$. These catches have teeth $f$ which project from their pivoted end portions at substantially a right-angle to their main portions. The faces 2 of these teeth form an acute-angle with their flanks 3 and the teeth have pointed ends. The main portions of the catches are longer than the teeth $f$ and they have tapered end portions 4.

G is a push-pin which is slidable between the main portions of the catches and which is provided with a head $g$ arranged in the slot D under the catches. This head has recesses $g'$ on its upper side and these recesses are arranged to engage with the faces 2 of the teeth and also with their angle portions 5 which are formed of a continuation of their flanks and main portions past the centers of their pivots.

The movable plate B has a face-plate or wear-plate H of metal provided with a hole $h$ which registers with a hole $b'$ in the plate B. The face-plate H has two spurs or tappets $h'$ at the sides of its hole $h$ which are inclined so as to project into the hole $b'$ and which are arranged so as to engage with the faces 2 of the teeth of the catches. The face-plate has also two flanges $i$ at its outer edges which are inclined so as to project part way over the face of the face-plate and form an acute-angle with it.

J is a spring arranged in the bottom part of the slot D and which bears against the head of the push-pin and the bottom of the slot. The head is provided with a small projection $j$ which engages with the spring and prevents it from slipping out of place.

When the end-gate, or other similar device, is open, the catches are turned to the position shown in Fig. 3 in which their main portions are substantially parallel with the push-pin, and the recesses $g'$ engage with the angle portions 5. When the end-gate is closed, the holes $h$ and $b'$ slip over the main portions of the catches and the push-pin, and the spurs $h'$ strike against the faces 2 of the teeth. The catches are turned slowly on their pivots when the end-gate is being closed, first by the spurs $h'$ and subsequently by the flanges $i$ which engage with the end portions 4. The flanks 3 of the catches force back the push-pin until the parts reach the position shown in Fig. 4. The catches then turn suddenly to the position shown in Fig. 2, and the push-pin is forced forward, with a snap, by its spring, so that the catches are locked, the faces 2 of the teeth bearing against the ends of the recesses. The flanges $i$ also operate as guards and prevent the device from being unlocked by the insertion of anything between the catches and the face-plate.

The fastener is unlocked by pressing the push-pin out of engagement with the teeth of the catches, and then opening the end-gate, or other similar device, so that the catches are turned on their pivots by the face-plate and the spurs on the face-plate which come in contact with the main portions of the catches. The spring-actuated push-pin holds the catches in their extreme positions until the push-pin is pushed back to release them.

What I claim is:

1. In a fastener, the combination, with a support, and a pillar secured thereto and provided with a slot; of two catches pivoted in the said slot and provided with teeth which project at an angle to their main portions, a spring-pressed push-pin arranged between the catches and provided with a head having recesses which engage with the said catches and their teeth and hold the main portions of the catches in their open and in their closed positions, and a movable plate provided with a hole which slips over the main portions of the catches and the push-pin and which has projections for operating the catches.

2. In a fastener, the combination, with a support, and a pillar secured thereto and provided with a slot; of two catches pivoted in the said slot and provided with teeth which project at an angle to their main portions, a spring-pressed push-pin arranged between the catches and provided with a head having recesses which engage with the said catches and their teeth and hold the main portions of the catches in their open and in their closed positions, and a movable plate provided with a hole which slips over the main portions of the catches and the push-pin and which has projections for operating the catches, certain of the said projections being arranged to overlap the main portions of the catches when in their closed position.

In testimony whereof I have affixed my signature in the presence of two witnesses.

LOUIS M. SMILEY.

Witnesses:
MABYL S. CALDWELL,
ALFRED C. THOMPSON.